United States Patent
Sumrall, Jr. et al.

(10) Patent No.: US 8,172,275 B2
(45) Date of Patent: *May 8, 2012

(54) COMPOSITE POLYMERIC TRANSITION PIPE FITTING FOR JOINING POLYMERIC AND METALLIC PIPES

(75) Inventors: Reese Sumrall, Jr., Charlotte, NC (US); James Marvin Polson, Jr., Monroe, NC (US); Nicholas George Peth, Monroe, NC (US); Paul Alan Spirkowyc, Rock Hill, SC (US); Julie Starnes Parker, Waxhaw, NC (US)

(73) Assignee: Charlotte Pipe and Foundry Company, Charlotte, NC (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/387,386

(22) Filed: May 1, 2009

(65) Prior Publication Data

US 2009/0284005 A1    Nov. 19, 2009

Related U.S. Application Data

(63) Continuation-in-part of application No. 10/923,227, filed on Aug. 20, 2004, now Pat. No. 7,527,302.

(60) Provisional application No. 60/496,808, filed on Aug. 21, 2003.

(51) Int. Cl.
*F16L 47/02* (2006.01)
*F16L 47/06* (2006.01)
*F16L 47/16* (2006.01)

(52) U.S. Cl. ............... 285/296.1; 285/286.1; 285/294.3; 285/423

(58) Field of Classification Search ............... 285/285.1, 285/286.1, 286.2, 292.1, 293.1, 294.1, 294.3, 285/294.4, 296.1, 423; 264/267–269
See application file for complete search history.

(56) References Cited

U.S. PATENT DOCUMENTS

| | | |
|---|---|---|
| 1,277,977 A | 9/1918 | Mann |
| 1,461,482 A | 7/1923 | Hahn |
| 2,461,337 A | 2/1949 | Miskimen |
| 2,770,476 A | 11/1956 | Cleverly |
| 2,776,151 A | 1/1957 | Harkenrider |
| 2,968,821 A | 1/1961 | Morin et al. |
| 3,018,519 A | 1/1962 | Morin et al. |
| 3,108,826 A | 10/1963 | Black |
| 3,245,701 A | 4/1966 | Leopold, Jr. et al. |
| 3,348,862 A | 10/1967 | Leopold, Jr. et al. |
| 3,612,584 A | 10/1971 | Taylor |
| 3,614,137 A | 10/1971 | Jacobson |
| 3,722,924 A * | 3/1973 | Bjornsen ............... 285/55 |

(Continued)

FOREIGN PATENT DOCUMENTS

JP        52024318 A  *  2/1977
(Continued)

*Primary Examiner* — James Hewitt
(74) *Attorney, Agent, or Firm* — K&L Gates LLP

(57) ABSTRACT

A pipe fitting includes a main polymeric body and a secondary polymeric body, of a different polymeric material, molded into and fixedly connected to the main body, so that the main body extends around the polymeric body. The secondary polymeric body extends around and is contiguous with a passageway of the pipe fitting, and at least partially defines a first opening of the passageway that is for being mated to a polymeric pipe. The main body extends around and is contiguous with the passageway, and at least partially defines a second opening of the passageway that is for being mated to a metallic pipe.

38 Claims, 13 Drawing Sheets

U.S. PATENT DOCUMENTS

| | | | |
|---|---|---|---|
| 3,819,207 A | | 6/1974 | Leopold, Jr. et al. |
| 3,858,914 A | | 1/1975 | Karie et al. |
| 4,011,652 A | * | 3/1977 | Black .......................... 29/455.1 |
| 4,014,568 A | * | 3/1977 | Carter et al. ...................... 285/39 |
| 4,067,072 A | * | 1/1978 | Izzi ..................................... 4/288 |
| 4,093,280 A | | 6/1978 | Yoshizawa et al. |
| 4,241,878 A | | 12/1980 | Underwood |
| 4,339,406 A | | 7/1982 | Underwood |
| 4,363,504 A | | 12/1982 | De Feo et al. |
| 4,377,894 A | | 3/1983 | Yoshida |
| 4,445,715 A | | 5/1984 | Inoue et al. |
| 4,522,434 A | * | 6/1985 | Webb ............................. 285/112 |
| 4,537,426 A | * | 8/1985 | Carter, Sr. ..................... 285/110 |
| 4,620,330 A | * | 11/1986 | Izzi, Sr. ............................ 4/288 |
| 4,708,374 A | * | 11/1987 | Cox ............................ 285/133.4 |
| 4,842,540 A | | 6/1989 | Endo et al. |
| 4,905,766 A | | 3/1990 | Dietz et al. |
| 5,109,929 A | | 5/1992 | Spears |
| 5,186,500 A | * | 2/1993 | Folkers ........................... 285/55 |
| 5,333,650 A | | 8/1994 | Folkman |
| 5,366,257 A | | 11/1994 | McPherson et al. |
| 5,406,983 A | | 4/1995 | Chambers et al. |
| 5,437,481 A | | 8/1995 | Spears et al. |
| 5,507,532 A | * | 4/1996 | Mitsui ............................. 285/61 |
| 5,551,141 A | | 9/1996 | De'Ath et al. |
| 5,582,439 A | | 12/1996 | Spears |
| 5,655,299 A | | 8/1997 | Lindahl |
| 5,851,472 A | | 12/1998 | Kashiyama |
| 5,861,120 A | | 1/1999 | Yagi et al. |
| 5,901,987 A | * | 5/1999 | Godeau ..................... 285/148.19 |
| 5,915,736 A | | 6/1999 | Marik et al. |
| 5,954,371 A | | 9/1999 | Koke et al. |
| 6,000,436 A | | 12/1999 | Auvil et al. |
| 6,070,915 A | | 6/2000 | Luo |
| 6,099,975 A | | 8/2000 | Peterson et al. |
| 6,135,508 A | | 10/2000 | Genoni et al. |
| 6,148,581 A | | 11/2000 | Separautzki |
| 6,361,083 B1 | * | 3/2002 | Riesselmann et al. ........ 285/333 |
| 6,378,912 B1 | | 4/2002 | Condon et al. |
| 6,460,432 B1 | | 10/2002 | Julian et al. |
| 6,521,160 B2 | | 2/2003 | Suzuki |
| 6,866,305 B2 | | 3/2005 | Spears |
| 6,991,268 B2 | | 1/2006 | Spears |
| 7,017,951 B2 | | 3/2006 | Spears |
| 7,527,302 B2 | * | 5/2009 | Lewis et al. ................. 285/296.1 |
| 7,980,602 B2 | * | 7/2011 | Charlson et al. ............. 285/382 |
| 7,988,204 B2 | * | 8/2011 | Lewis et al. ................. 285/296.1 |
| 2002/0096883 A1 | * | 7/2002 | Youssefifar ................... 285/319 |
| 2003/0146620 A1 | | 8/2003 | Young et al. |
| 2004/0155457 A1 | | 8/2004 | Mejlhede et al. |

FOREIGN PATENT DOCUMENTS

| | | |
|---|---|---|
| JP | 361290019 A | 12/1986 |

* cited by examiner

COMPOSITE POLYMERIC TRANSITION PIPE FITTING FOR JOINING POLYMERIC AND METALLIC PIPES

CROSS-REFERENCE TO RELATED APPLICATION

The present application is a continuation-in-part and claims the benefit of U.S. patent application Ser. No. 10/923,227, filed Aug. 20, 2004, now U.S. Pat. No. 7,527,302, entitled "PIPE FITTING AND ASSOCIATED METHODS AND APPARATUS," which claims the benefit of U.S. Provisional Application 60/496,808, filed Aug. 21, 2003, each incorporated herein by reference.

BACKGROUND OF THE INVENTION

One aspect of the present invention relates to a pipe fitting for connecting between dissimilar pipes, or the like, and, more particularly, for connecting between metallic and polymeric pipes, or the like. Another aspect of the present invention relates to such a pipe fitting made substantially, preferably entirely, of polymeric materials. A further aspect of the invention relates to a pipe fitting of the described type wherein differing portions or parts of the fitting are made compositely of different polymeric materials.

It is common for substances to flow between metallic and polymeric pipes that are connected by a pipe fitting, sometimes commonly referred to as a transition fitting. As a more specific example, water is often supplied from an upstream metallic pipe to a downstream polymeric pipe that is the inlet of a plumbing fixture or appliance, such as a faucet or the like. It is critical for this type of pipe fitting to remain watertight, often for very many years. Nonetheless, it is common for some of these pipe fittings to occasionally fail, since they are typically exposed to many cycles of stress caused by variations in the pressure and/or temperature of the water being supplied.

A known pipe fitting for connecting between metallic and polymeric pipes is formed by separately manufacturing generally cylindrical polymeric and metallic bodies, and then connecting the bodies to one another. The polymeric body is inserted into an annular opening of the metallic body, and then the annular edge of the opening is bent inward (e.g., crimped) to hold the polymeric body in the metallic body. For this known pipe fitting, the polymeric body extends around a passageway of the pipe fitting and defines a first opening to the passageway, and the first opening is for being mated to the polymeric pipe. In addition, the metallic body extends around the polymeric body and defines a second opening to the passageway, and the second opening is for being mated to the metallic pipe. These pipe fittings have been known to fail at the crimp, because the crimping can weaken the metallic body.

An environmental disadvantage of known fittings which are formed compositely of both metal and plastic materials is that the brass alloys commonly used in many such fittings contain lead which may leach out of the fitting into water flowing through the fitting. Also, such composite fittings suffer failures in use due to "dezincification" by gradual extraction of the zinc content in brass alloys causing the brass to become porous and brittle.

Accordingly, there is a need in the industry for improved pipe fittings for connecting between metallic and polymeric pipes.

BRIEF SUMMARY OF SOME ASPECTS OF THE INVENTION

The present invention has various and diverse aspects, including the provision of an improved pipe fitting that is capable of connecting between dissimilar pipes, tubing and the like, such as, but not limited to, metallic and polymeric pipes which may be used as pieces of plumbing. The present invention further provides such a pipe fitting made substantially, preferably entirely, of polymeric materials. A more particular aspect of the invention provides a pipe fitting of the above-described type wherein differing portions or parts of the fitting are made compositely of different polymeric materials. Further aspects of the present invention provide methods and apparatus for making pipe fittings.

In accordance with one aspect of the present invention, a composite pipe fitting includes a tubular main fitting body with a secondary tubular polymeric body that is molded to and fixedly connected to the main body. It is preferred for at least a portion of the secondary body to be molded into the main body such that the main body extends around the secondary body. The secondary body extends around and is contiguous with a passageway of the pipe fitting. The secondary body also at least partially defines a forward opening of the passageway that is for being mated to a first pipe, typically a polymeric pipe such as, but not limited to, a piece of polymeric pipe plumbing. The main body at least partially defines a rearward opening of the passageway that is for being mated to a second dissimilar pipe, typically a metallic pipe such as, but not limited to, a piece of metallic pipe plumbing. It is preferred for the main body to extend around and be contiguous with the passageway.

Under a related aspect of the invention, the first polymeric material may be selected to have physical characteristics compatible with the metallic material of the metallic pipe, for example for facilitating threaded connection therebetween, and the second polymeric material may be selected to have physical characteristics compatible with the polymeric material of the polymeric pipe, for example for facilitating bonding therebetween. The first and second polymeric materials may be selected to have physical characteristics that are compatible with one another, such as comparable, similar or otherwise compatible coefficients of expansion and contraction.

As further example, the main body may have physical characteristics such as hardness and flexure comparable to the metallic material of the metallic pipe. To this end, the polymeric material of the main body may comprise polyamide or polyphthalamide, and may have reinforcing fibers dispersed within the first polymeric material, for example, reinforcing fibers selected from the group consisting of carbon, glass, aramid (e.g. "Kevlar" brand) and stainless steel fibers. The polymeric material of the secondary body may comprise chlorinated polyvinyl chloride.

Various advantages may derive from the above-described features of this invention. As compared to fittings formed compositely of both metal and plastic materials to facilitate joinder of plastic and metal pipe, fittings according to the present invention using polymeric materials for both the main and secondary fitting bodies avoid a possible environmental hazard that metallic alloys such as brass which contain lead may suffer leaching of lead out of the fitting into water or other fluid flowing through the fitting. Also, composite polymeric fittings under the present invention avoid the risk of metallic fittings which can fail in use due to gradual extraction of alloy ingredients, e.g., "dezincification" of the zinc content in brass alloys, causing the metal to become porous and brittle. The use of polymeric materials for both the main and secondary bodies in fittings of the present invention also enables the selection of the different polymers to have compatible expansion and contraction characteristics, which can be a problem with composite fittings made of metal and polymer components which may risk poor sealing due to differential expansion and contraction of the metal and polymer parts.

According to further aspects of the present invention, the spiral thread of the second end of the main body may be formed exteriorly thereabout to mate with a metallic pipe having interior threads or may be formed interiorly thereabout to mate with a metallic pipe having exterior threads, which facilitates connection of the composite fitting to a piece of plumbing or other pipe by twisting. The main body may also include an outer polygonal portion for being engaged by a wrench for facilitating the twisting.

In accordance with another aspect of the present invention, restrictions in relative movement between the main and secondary bodies are advantageously facilitated by virtue of contact therebetween. For example, at least one protrusion of one of the bodies may be mated with at least one shoulder, cavity or hole of the other body in a manner that restricts relative movement between the bodies. The main body may include a hole extending through the main body into communication with the annular interior surface at the first end of the main body, and the tubular secondary body may include a protrusion extending into and obstructing the hole. At least one of the protrusions and corresponding cavities (e.g., grooves) may be annular and may contain an O-ring, for sealing purposes.

By further example, the annular interior surface of the first end of the main body may be recessed for receiving the tubular secondary body, with an annular interior shoulder adjacent the annular interior recess surrounding the passage between the first and second ends of the main body. The tubular secondary body may be formed to have an outward end thereof flush with the first end of the main body at the first opening, thereby to define the first opening and to be readily viewable such that the viewable flush end may include indicia. The tubular secondary body may terminate at its opposite end at or adjacent the shoulder, whereby the secondary body does not extend for the entire length of the main body and the interior end of the secondary body is thereby hidden. For example, the secondary polymeric body may abut against the shoulder or an O-ring may optionally be disposed between the secondary body and the shoulder. If an O-ring is provided, the O-ring may be formed of a third polymeric material, e.g., a thermoplastic elastomer such as a thermoplastic vulcanizate, and may be intimately molded to the annular shoulder. The main body may include an annular groove surrounding the first opening adjacent the recessed annular interior surface of the first end of the main body, and the secondary polymeric body may include an annular protrusion extending radially outwardly into intimate surface contact with the annular groove.

In accordance with another aspect of the present invention, the secondary polymeric body may be formed by injecting molding material through a hole in the sidewall of the main body. In accordance with some embodiments of the present invention, the sidewall is cylindrical, and the hole extends radially away from the axis around which the cylindrical side wall extends. The hole in the sidewall of the main body is preferably for receiving the molding material from a gate in a jig that holds the main body in a predetermined manner. It is preferred for the hole to be positioned between the outwardly viewable end of the secondary polymeric body and the substantially hidden, inward end of the secondary polymeric body. The hole may be closer to the inward end of the secondary polymeric body than it is to the outward end of the secondary polymeric body. This advantageously helps to ensure that the secondary polymeric body is fully and properly formed within the main body. It is preferred for the secondary polymeric body to include a protruding portion that at least partially occupies the hole, which further secures the bodies to one another. Each of the composite fittings can include at least one additional hole, which is for having molding material injected thereinto, and associated structures.

In some embodiments of the present invention, an internal stop, which is preferably annular and may be part of the main or secondary polymeric body, may be formed to protrude into the passageway for engaging an end of the polymeric pipe, or other piece of plumbing, inserted into composite fitting, for arresting relative movement between the composite fitting and the piece of plumbing (e.g., polymeric pipe). Likewise, an internal or external stop, which is preferably annular and may be part of the main body, may be provided for engaging an end of the metallic pipe or fitting, or other piece of plumbing, installed to the composite fitting, for arresting relative movement between the composite fitting and the piece of plumbing (e.g., metallic pipe or fitting).

In accordance with one aspect of the present invention, the composite fitting is advantageously compact as compared to comparable conventional fittings.

Other aspects and advantages of the present invention will become apparent from the following disclosure and the accompanying drawings.

BRIEF DESCRIPTION OF THE DRAWINGS

Figure 1:
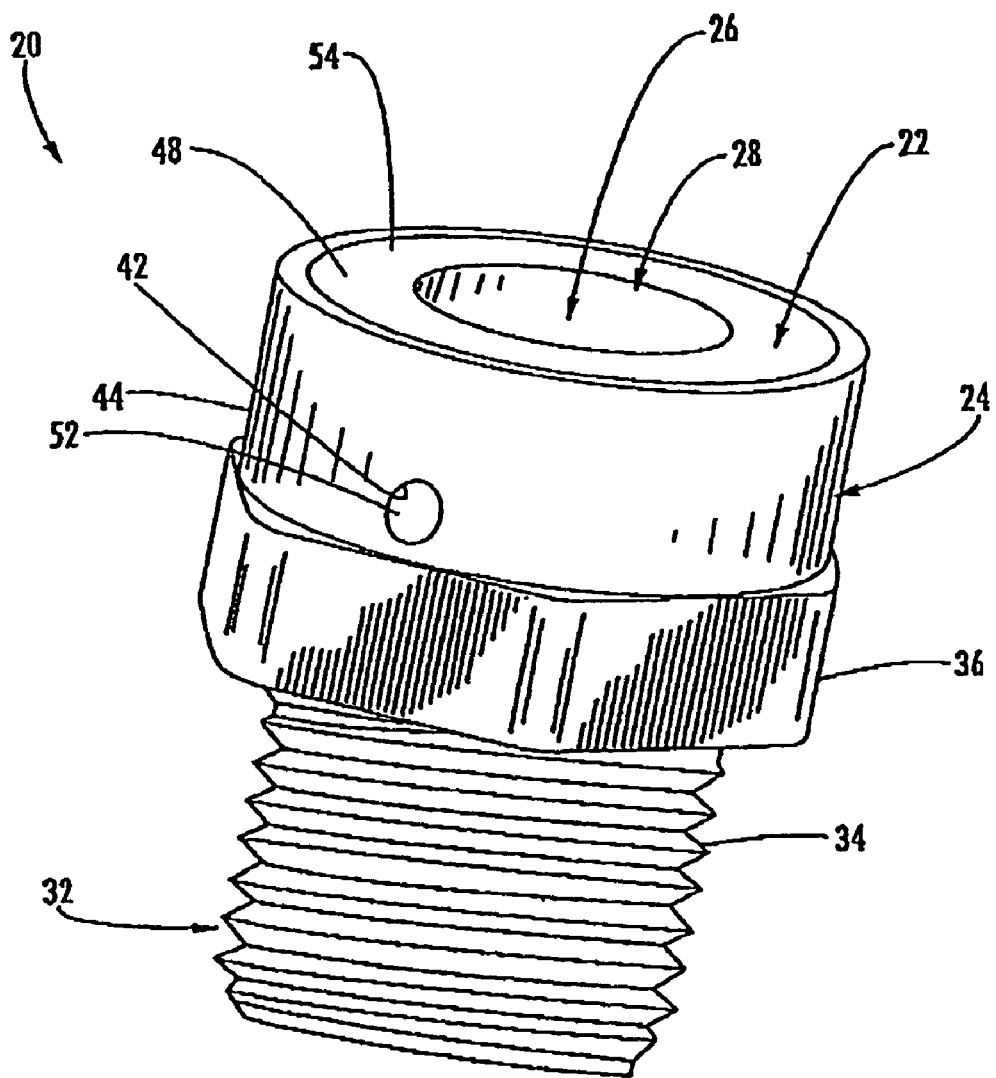
Figure 2:
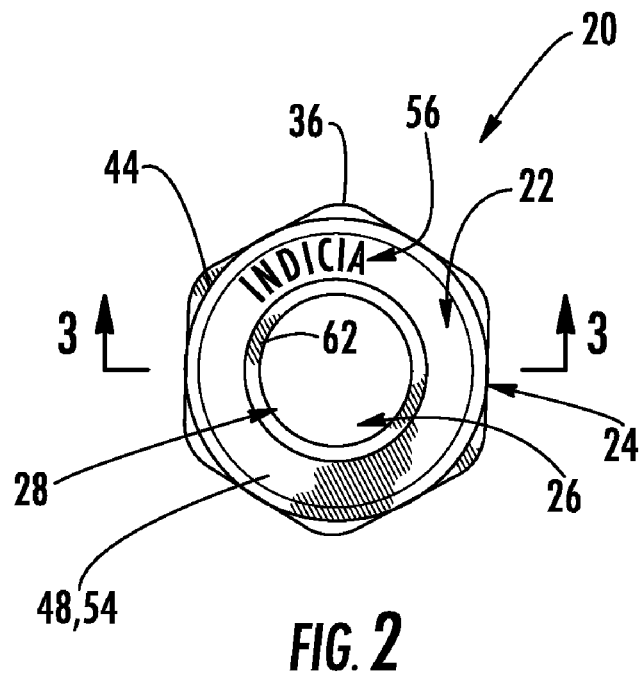
Figure 3:
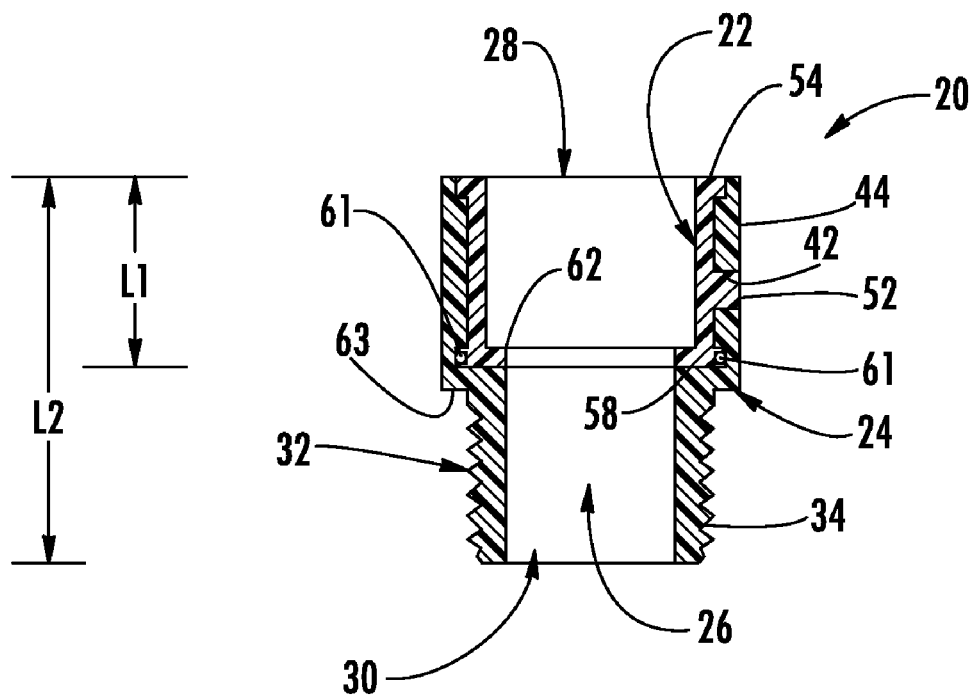
Figure 4:
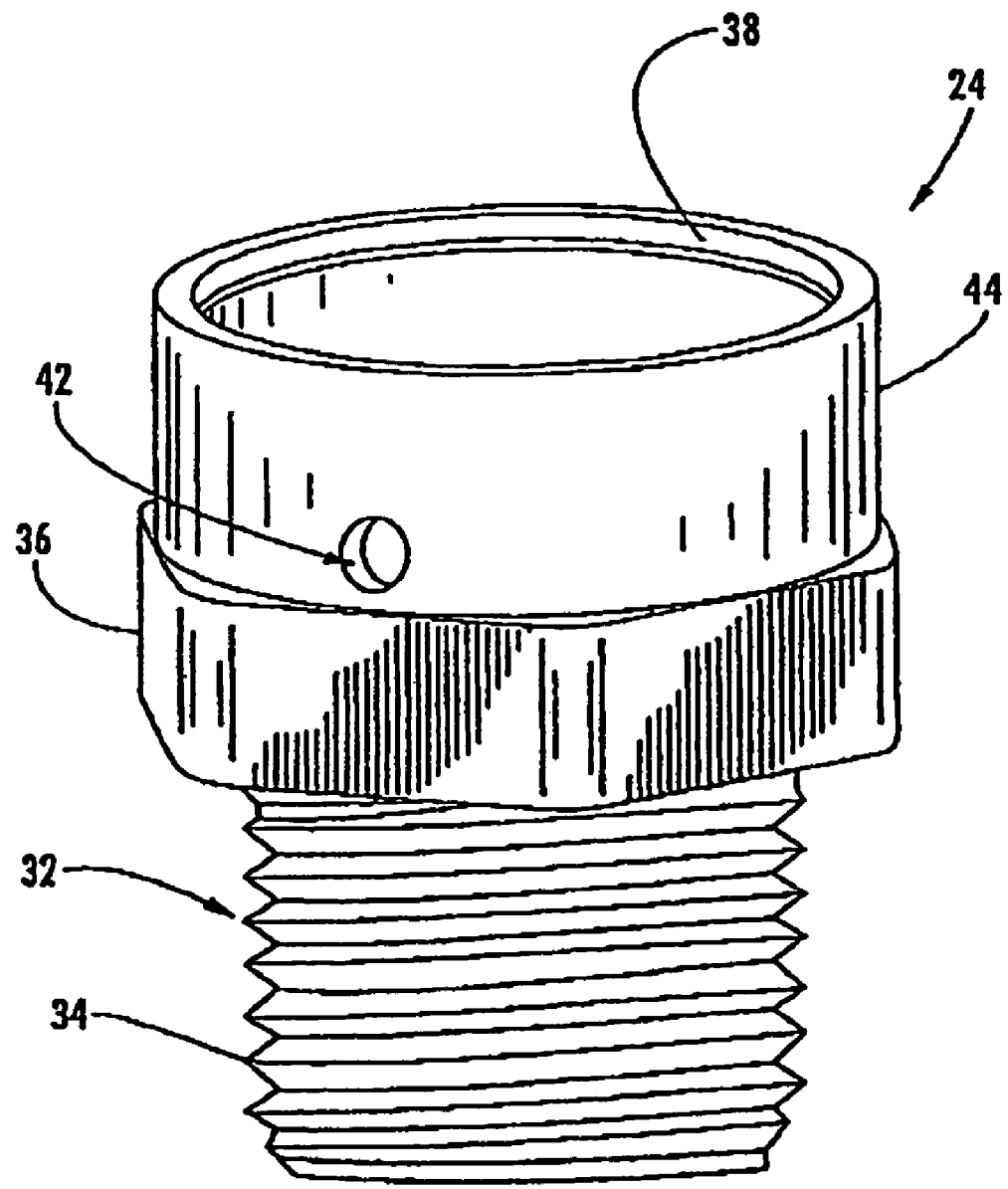
Figure 5:
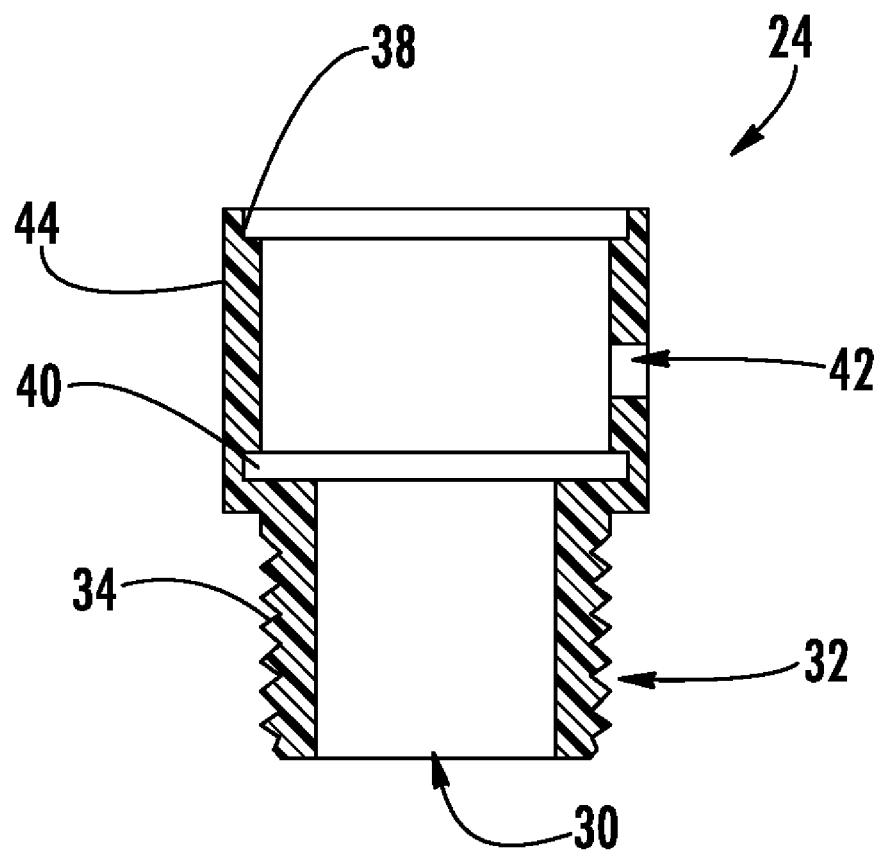
Figure 6:
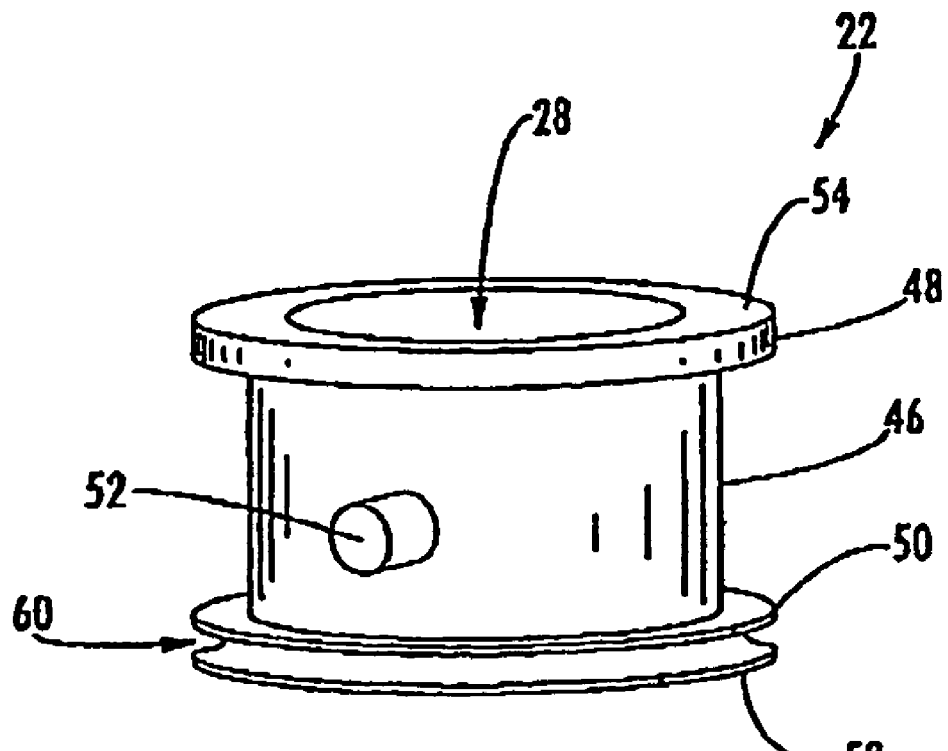
Figure 7:
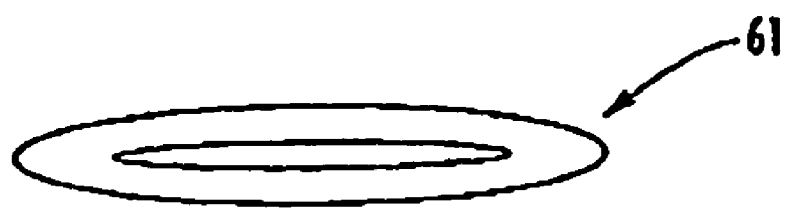
Figure 8:
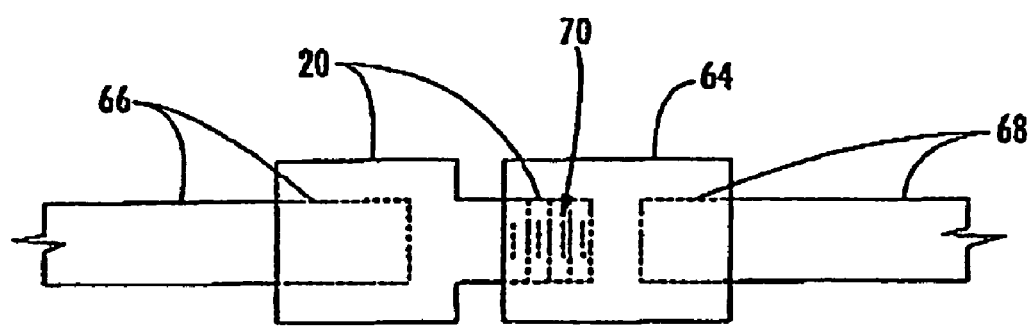
Figure 9:
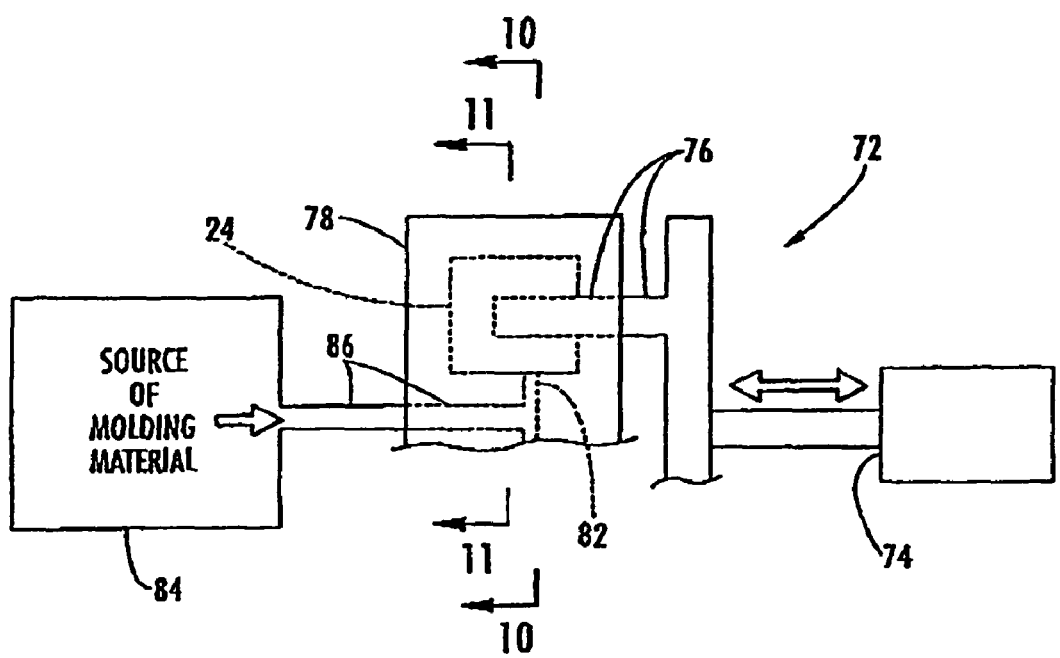
Figure 11:
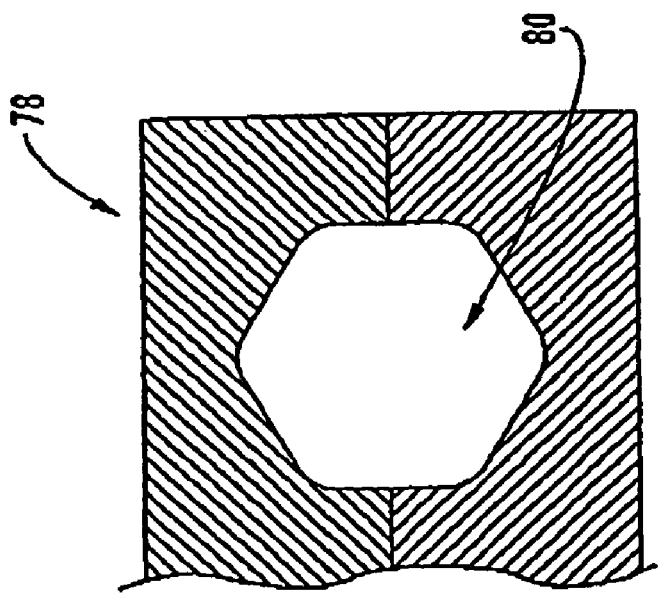
Figure 10:
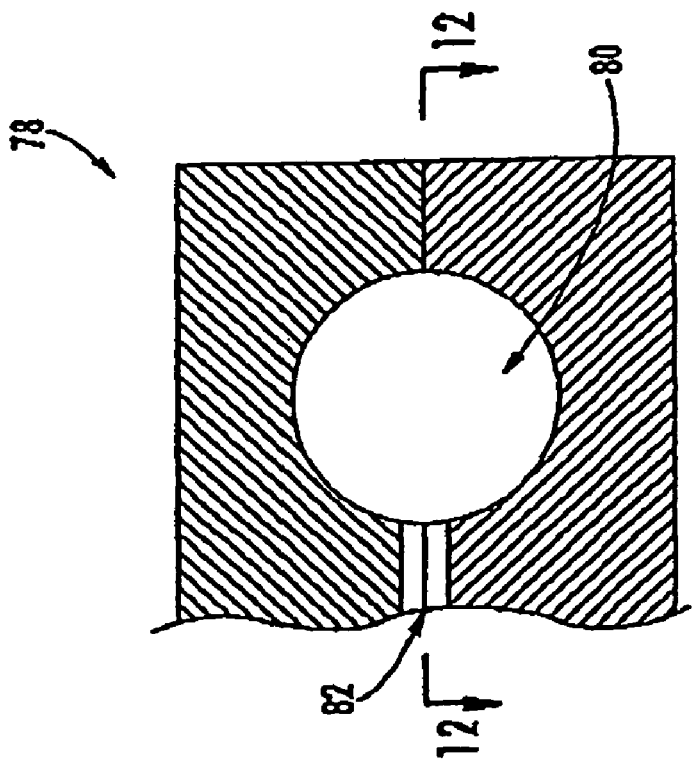
Figure 12:
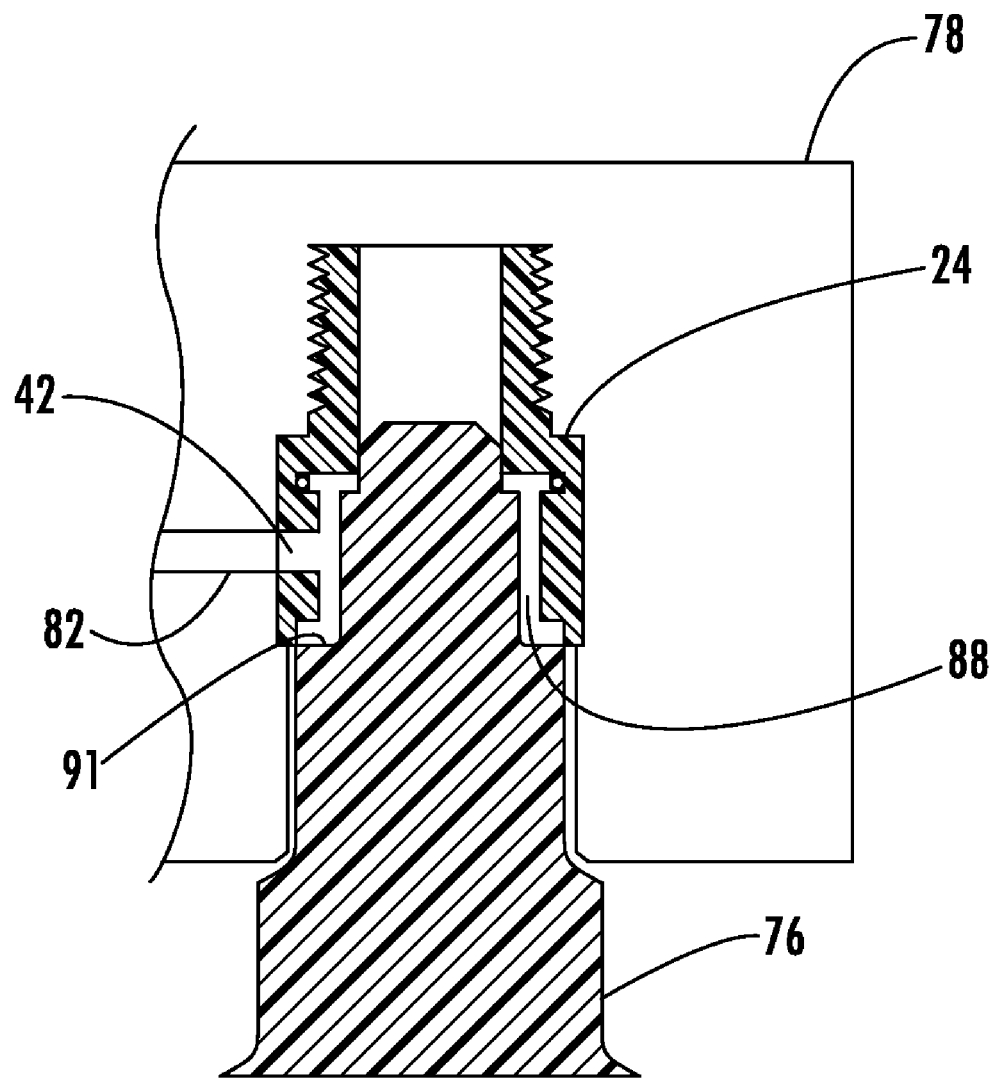
Figure 13:
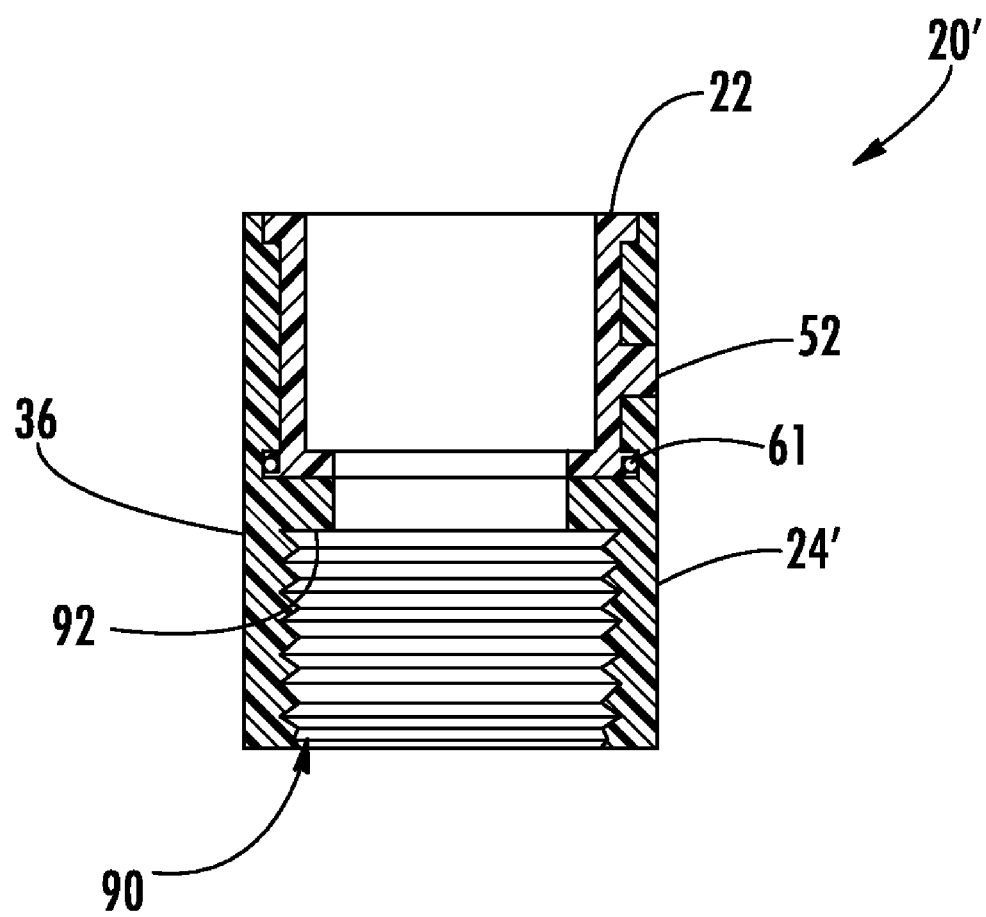
Figure 14:
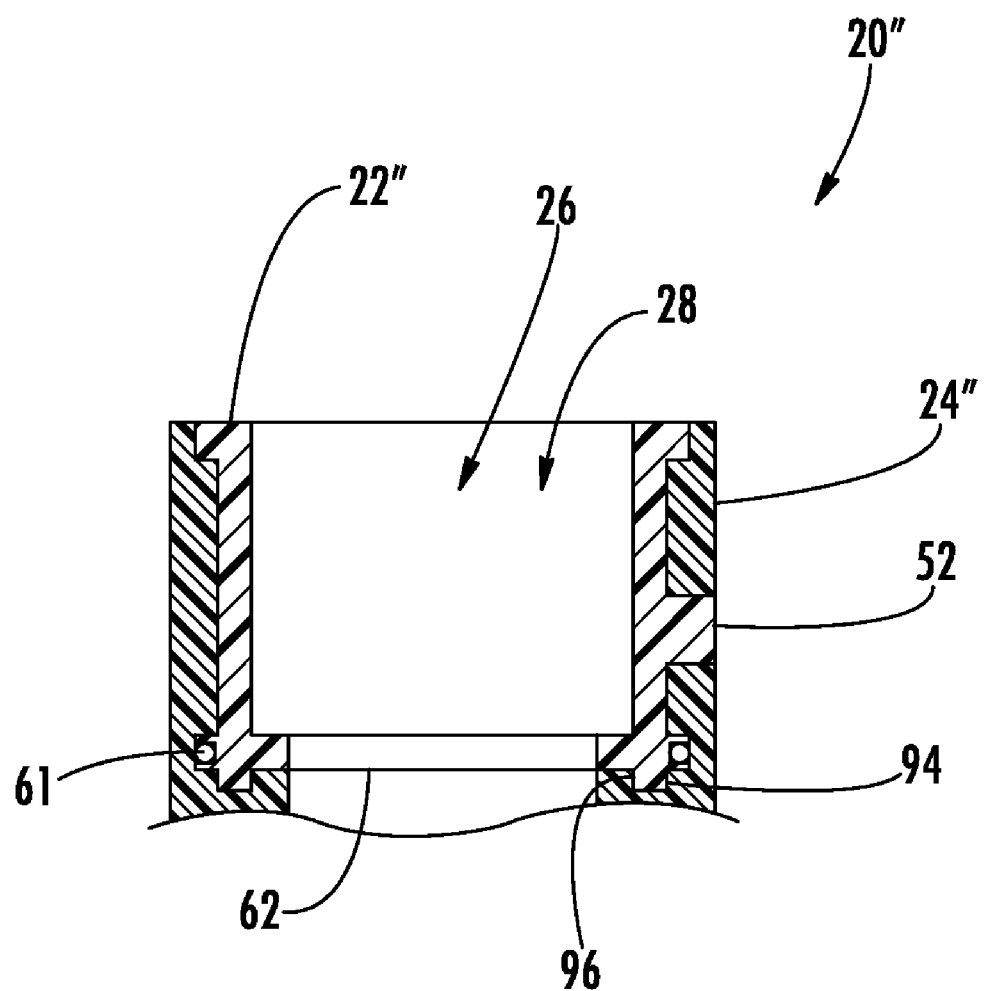
Figure 15:
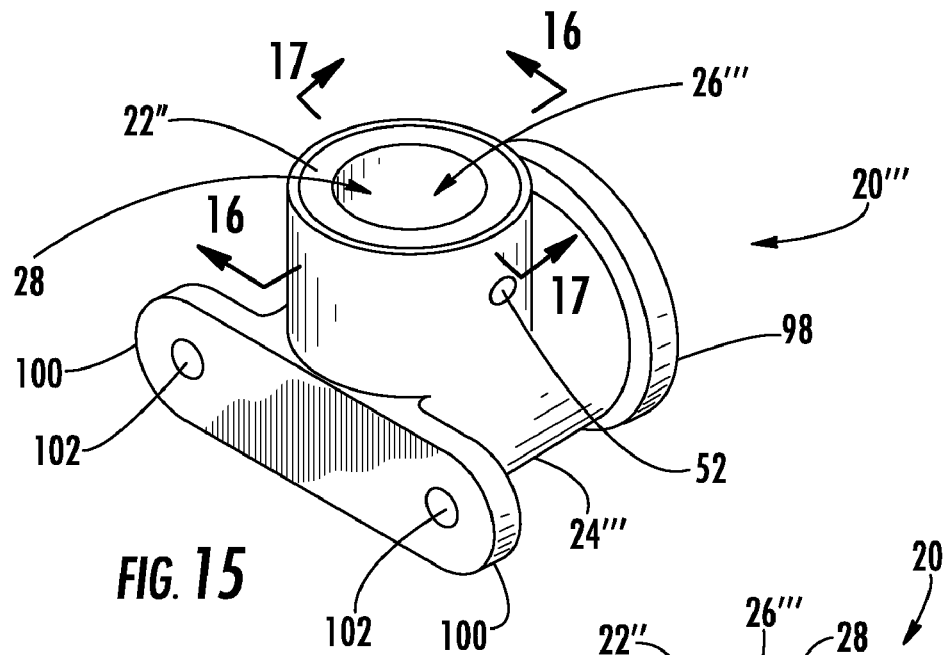
Figure 16:
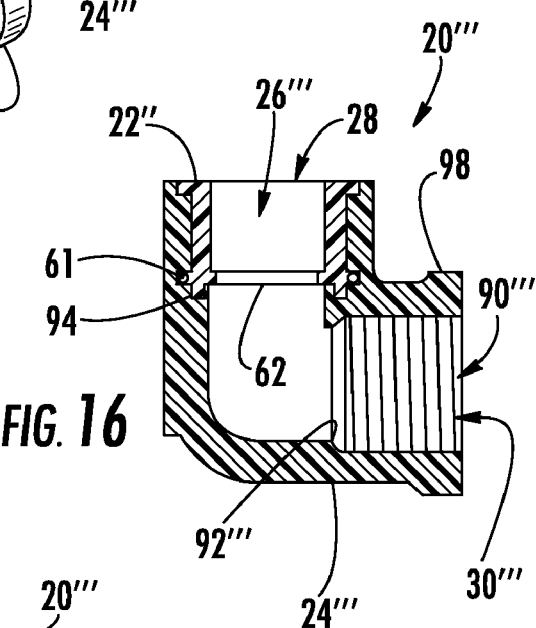
Figure 17:
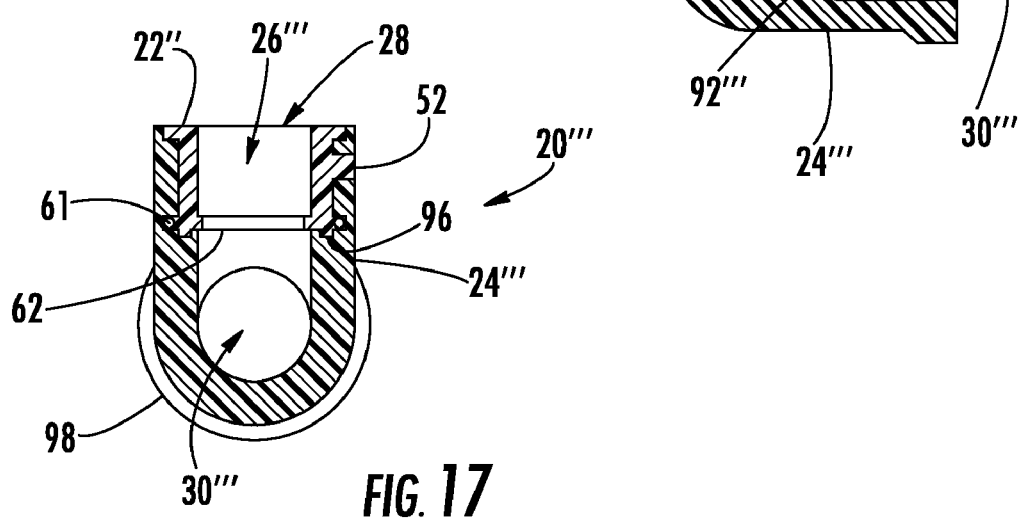
Figure 18:
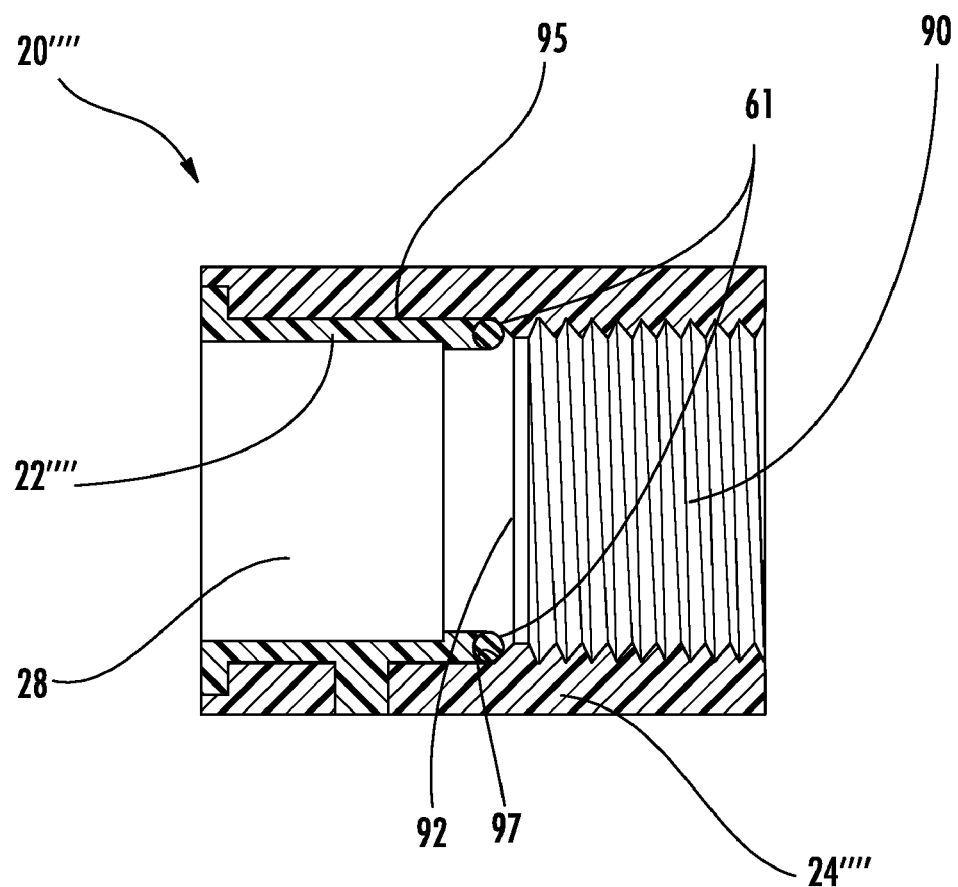

Having thus described the invention in general terms, reference will now be made to representative preferred embodiments of the invention in the accompanying drawings, which are not necessarily drawn to scale, and wherein:

FIG. 1 is a pictorial view of a composite polymeric transition fitting that is for connecting between polymeric and metallic pipes, in accordance with an exemplary embodiment of the present invention;

FIG. 2 is an elevational view of the front end of composite fitting of FIG. 1;

FIG. 3 is a cross-sectional view of the composite fitting taken along line 3-3 of FIG. 2;

FIG. 4 is an isolated pictorial view of the main body of the composite fitting of FIG. 1;

FIG. 5 is an isolated cross-sectional view of the main body taken along line 3-3 of FIG. 2;

FIG. 6 is an isolated pictorial view of the secondary polymeric body of the composite fitting of FIG. 1;

FIG. 7 is an isolated pictorial view of an O-ring of the composite fitting of FIG. 1;

FIG. 8 schematically illustrates the composite fitting of FIG. 1 connecting polymeric and metallic pipes, in accordance with the exemplary embodiment of the present invention;

FIG. 9 schematically illustrates a molding machine for manufacturing the composite fitting of FIG. 1, with the machine containing the main body, in accordance with the exemplary embodiment of the present invention;

FIG. 10 is an isolated, cross-sectional view of a portion of the jig of the molding machine of FIG. 9, with the cross-section taken along line 10-10 of FIG. 9;

FIG. 11 is an isolated, cross-sectional view of a portion of the jig taken along line 11-11 of FIG. 9;

FIG. 12, is a cross-sectional view of a portion of the molding machine of FIG. 9, with the machine containing the main body and the cross-section taken along lines 12-12 of FIG. 10;

FIG. 13 is a cross-sectional view of a composite fitting in accordance with another exemplary embodiment of the present invention;

FIG. 14 is a cross-sectional view of a portion of a composite fitting in accordance with other exemplary embodiments of the present invention;

FIG. 15 is a pictorial view of a composite fitting in accordance with another embodiment of the present invention;

FIG. 16 is a cross-sectional view of the composite fitting of FIG. 15 taken along line 16-16 of FIG. 15;

FIG. 17 is a cross-sectional view of the composite fitting of FIG. 15 taken along line 17-17 of FIG. 15; and FIG. 18 is a cross-sectional view of a composite fitting in accordance with another exemplary embodiment of the present invention.

DETAILED DESCRIPTION OF THE INVENTION

The present inventions now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1-3 illustrate a composite fitting 20 that is suitable for connecting between pieces of plumbing such as, but not limited to, polymeric and metallic pipes, in accordance with an exemplary embodiment of the present invention. However, although the composite fitting 20 is often described herein in the context of its suitability and preferred application for connecting between polymeric and metallic plumbing pipes, the composite fitting 20 has many other uses that are not limited to connecting between polymeric and metallic pipes per se but rather the fitting of the present invention is contemplated to have application for joining various and diverse tubular fluid flow elements, including but not limited to pipes and other tubular elements of differential materials, in various and diverse fluid flow environments. For example, the composite fitting 20 may have applicability for joining tubular elements that may be more commonly referred to as tubes or couplings or by other terms, and/or which may meet differing standards of differing industries, such as so-called copper tube size (CTS) and iron pipe size (IPS) elements. By further example, the fitting 20 can be connected to other tubular fluid flow devices such as valves, fittings or other pieces of plumbing, or the like, that can be of differing materials and may be associated with plumbing fixtures or appliances. Thus, while the disclosure herein refers to the application of fittings of the present invention for connecting pipes and plumbing pieces, these terms are not intended as limitations on the broad scope and applicability of the invention, Rather, the terms pipe and plumbing piece, or like terms used herein, are used and intended in a broader and more general sense intended to encompass all such applications of the present invention. Those of ordinary skill in the art will understand and appreciate the wide variety of uses for the composite fitting 20, and the present invention is not intended to be limited to the embodiments described herein.

The composite fitting 20 includes a main tubular body 24 with a secondary tubular body 22 that is preferably molded into and fixedly connected to the main body 24, and the bodies are preferably coaxial. The secondary body 22 is preferably fixed to the main body 24 by conforming to the internal surface of the main body, as will be discussed in greater detail below. It is preferred for the main body 24 to extend around the secondary body 22, so that the main body advantageously reinforces the secondary body.

The secondary body 22 and the main body 24 each comprise, and preferably consist substantially and essentially of, polymeric material, but are typically of differing polymeric materials selected to impart differing selected characteristics to the two bodies. For example, the main body 24 may preferably be of a first polymeric material selected to have physical characteristics (including characteristics of the polymeric compound) compatible with metallic materials of metallic pipes, which facilitates the making of connections therebetween, e.g., facilitating formation of threads on the main body and facilitating threaded connection between the main body and a threaded end of a pipe or other plumbing piece. The secondary body 22 may preferably be of a second polymeric material selected to have physical characteristics (including characteristics of the polymeric compound) compatible with polymeric materials of polymeric pipes, to facilitate the making of connections therebetween, e.g., facilitating bonding therebetween, including adhesive, chemical, thermal or other bonding. The polymeric materials for the main body 24 and the secondary body 22 may preferably also be selected to have physical characteristics that are compatible with one another, such as having corresponding, complementary or compatible coefficients of expansion and contraction, coefficients of friction, etc.

For example, the main body 24 may be formed of a selected engineered polymeric material or composition to impart physical characteristics such as hardness and flexure comparable to the metallic materials of metallic pipes. To this end, the polymeric material of the main body 24 may comprise polyamide or polyphthalamide, and may have reinforcing fibers dispersed within the first polymeric material, for example, reinforcing fibers such as carbon, glass, aramid and stainless steel fibers. The polymeric material of the secondary body 22 may comprise chlorinated polyvinyl chloride (CPVC), which is a common polymer used in the manufacture of many plastic plumbing pipes.

The secondary body 22 extends around and is preferably contiguous with (e.g., contacts and defines) a portion of a passageway 26 that extends through the composite fitting 20, and the secondary body defines a first opening 28 (sometimes referred to herein as a forward opening) to the passageway 26. The forward opening 28 is preferably part of a receptacle of the composite fitting 20 that is for internally receiving the polymeric pipe, as will be discussed in greater detail below. Similarly, and as best understood with reference to FIG. 3, the main body 24 extends around and is preferably contiguous with (e.g., contacts and defines) a portion of the passageway 26 of the composite fitting 20, and the main body 24 defines a second opening 30 (sometimes referred to herein as a rearward opening) to the passageway 26. As illustrated in FIGS. 1-3, the rearward opening 30 in this embodiment of the fitting 20 is part of an open plug portion 32 of the main body 24 that is for externally receiving the metallic pipe. The plug 32 preferably includes an external spiral thread 34 for connecting the plug to the metallic pipe, or the like, by twisting, as will be discussed in greater detail below. On the other hand, the thread 34 can be omitted and the connection can be facilitated by other means. As illustrated in FIGS. 1-3, the forward opening 28 and the rearward opening 30 are the only openings to the passageway 26.

As best understood with reference to FIGS. 1, 2 and 4, the main body 24 may include an outer polygonal portion 36, which is preferably hexagonal, for being engaged by a wrench, to facilitate twisting of the composite fitting 20 for installation purposes, as will be discussed in greater detail below. However, other embodiments of the fitting 20 are also contemplated without any such hexagonal or other polygonal portion.

As best understood with reference to FIG. 5, which is an isolated cross-sectional view of the main body 24, the main body includes annular, outwardly extending, forward and rearward cavities or grooves 38, 40 that respectively include annular, outwardly extending shoulders which encircle, and preferably extend perpendicularly with respect to, the central axis of the main body. As best understood with reference to FIGS. 4 and 5, it is preferred for a cylindrical hole 42 to extend through a cylindrical sidewall 44 of the main body 24. The hole 42 preferably extends radially away from the central axis of the main body 24. That is, the hole 42 preferably extends angularly away from the passageway 26 through the composite fitting, and most preferably an angle of about 90 degrees is defined between central axes of the hole and the passageway.

As best understood with reference to FIG. 6, which is an isolated view of the secondary body 22, it preferably includes a generally cylindrical, annular midportion 46. Annular, outwardly extending, forward and rearward protrusions 48, 50 are at opposite ends of the midportion 46 of the secondary body 22. The protrusions 48, 50 respectively include annular, outwardly extending shoulders that encircle, and preferably extend perpendicularly with respect to, the central axis of the secondary body 22. The secondary body 22 further includes a protrusion or stub 52 that extends outwardly from the outer surface of the midportion 46. The stub is preferably cylindrical and extends radially away from the secondary body 22.

The forward protrusion 48 of the secondary body 22 includes a forward end face 54 that faces axially outwardly away from the main body 24, and extends around and defines the forward opening 28. As illustrated in FIGS. 1 and 3, the end face 54 is at least about flush with the adjacent end of the main body 24, and preferably the end face and the adjacent end of the main body are substantially flush. In accordance with the exemplary embodiment of the present invention, the surface area of the forward end face 54 is sufficiently broad so that it can be molded to include, or otherwise marked to include, indicia (e.g., letters, numbers, symbols and/or other markings for conveying information). As illustrated in FIG. 2, exemplary indicia 56 of the forward end face 54 can be seen in an end elevational view of the composite fitting 20.

Referring to FIG. 6, the rearward protrusion 50 of the secondary body 22 includes a rearward end face 58 that faces one of the shoulders of the main body 24 and is hidden from view in the assembled configuration of the composite fitting 20. In accordance with the exemplary embodiment of the present invention, the rearward protrusion 50 includes an outwardly open, annular groove 60 that, together with the rearward groove 40 (FIG. 5) of the main body 24, contains or encases a polymeric O-ring 61 (FIG. 7) in the assembled configuration of the composite fitting 20. In accordance with an alternative embodiment of the present invention, the O-ring 61 is omitted.

The assembled configuration of the composite fitting 20 can be best understood with reference to FIGS. 1 and 3, and with occasional reference also to FIGS. 5 and 6. Relative movement between the bodies 22, 24 is advantageously restricted by virtue of the contact between the main and secondary bodies, with that contact resulting from the secondary polymeric body having been molded into the main polymeric body. For example, the protrusions 48, 50 (FIG. 6) of the secondary body 22 respectively extend into the grooves 38, 40 (FIG. 5) of the main body 24, so that the shoulders of the protrusions and grooves respectively engage one another in a manner that restricts relative movement between the bodies at least in the axial direction. Likewise, the stub 52 (FIGS. 1, 3 and 6) of the secondary body 22 closes and occupies (e.g., plugs) the hole 42 (FIGS. 1 and 4) of the main body 24 in a manner that restricts relative movement between the bodies in the axial direction. The stub 52 can substantially fill the hole 42. In addition, the stub 52 occupies the hole 42 in a manner that restricts relative rotation between the bodies 22, 24 about the central axis of the composite fitting 20. That is, in accordance with the exemplary embodiment of the present invention, the secondary and main bodies 22, 24 are connected to one another without requiring that the main body be bent for facilitating this connection; therefore, the composite fitting 20 is advantageously not weakened by the connection. In accordance with alternative embodiments of the present invention, one or more of the stub 52, hole 42, grooves 38 and 40, and protrusions 48 and 50 may be omitted, and it is within the scope of the present invention for other contact between the secondary body 22 and the main body 24 to restrict undesired relative movement therebetween.

As shown in FIGS. 2 and 3, in accordance with the exemplary embodiment of the present invention, the secondary body 22 further includes an annular, inwardly extending protrusion 62 having annular shoulders which encircle, and preferably extend perpendicularly with respect to, the central axis of the composite fitting 20. One of the shoulders of the protrusion 62 functions as a stop for engaging an end of a polymeric pipe inserted into the forward opening 28. The stop feature of the protrusion 62 is for arresting relative movement between the polymeric pipe and the composite fitting 20. The other shoulder of the protrusion 62 is for engaging a corresponding shoulder of the main body 24 for reinforcing the protrusion 62 and for further securing the bodies 22, 24 to one another. In accordance with an alternative embodiment of the present invention, the inwardly extending protrusion 62 can be omitted and/or replaced with another component, which may be a part of the main body 24, that functions as a backstop for the polymeric pipe.

As best understood with reference to FIG. 3, in accordance with the exemplary embodiment of the present invention, the length L1 of the secondary body 22 is less than the length L2 of the main body 24. The length L1 may vary in differing embodiments of the fitting 20 and, for example, may range between about 33% to about 67% of the length L2, and most preferably the length L1 is about 43% of the length L2. Also in accordance with the exemplary embodiment of the present invention, the plug portion 32 of the main body 24 has a smaller outer diameter than the remainder of the main body. As a result, an outer and outwardly extending annular shoulder 63 of the main body 24 can function as a stop for engaging an end of a metallic pipe or fitting installed onto the plug portion 32, for arresting relative movement between the composite fitting 20 and the metallic pipe or fitting.

FIG. 8 schematically illustrates a coupling, which includes the composite fitting 20 and a metallic fitting 64, connecting a polymeric pipe 66 and a metallic pipe 68 so that they are in fluid communication with one another, in accordance with the exemplary embodiment of the present invention. In accordance with one example of the exemplary embodiment of the present invention, the metallic pipe 68 is connected to the metallic fitting 64 in a conventional manner, such as by soldering, or the like. In FIG. 8, the metallic pipe 68 is partially illustrated by broken lines as extending into an opening of a passageway that extends through the metallic fitting 64. The metallic pipe 68 and the metallic fitting 64 can be together considered to be and referred to as a metallic pipe. For the embodiment illustrated in FIG. 8, an opening of the passageway that extends through the metallic fitting 64 includes internal threads 70 that are hidden from view and are, therefore, schematically illustrated by broken lines in FIG. 8. The external threads 34 (FIGS. 1 and 3-5) of the main body 24 of the composite fitting 20 are threaded into the internal threads 70 of the metallic fitting 64 by relatively twisting the fittings. Accordingly, broken lines in FIG. 8 illustrate the composite fitting 20 extending into the passageway that extends through the metallic fitting 64.

As alluded to previously, the composite fitting 20 can be connected to items other than the metallic fitting 64 and metallic pipe 68. For example, other plumbing items can be connected to the composite fitting 20 in place of the metallic fitting 64 and metallic pipe 68. As one example, the threads 34 of the composite fitting 20 can be mated with metallic threads of valves, fittings or other pieces of plumbing, or the like, that can be associated with plumbing fixtures or appliances. Those of ordinary skill in the art will understand that there can be a wide variety of uses for the composite fitting 20.

An end of the polymeric pipe 66 is inserted into the forward opening 28 (FIGS. 1-3) of the composite fitting 20 and secured therein by way of solvent welding, adhesives, or the like. Broken lines in FIG. 8 illustrate the polymeric pipe 66 extending into the forward opening 28 of the composite fitting 20. Although not illustrated in the figures, and as best understood with reference to FIGS. 1 and 6, it is preferred for the entirety of the annular edge of the secondary body 22 that defines the forward opening 28 (e.g., the edge of the of the secondary body 22 which is located at the inner periphery of the forward end face 54) to be slightly rounded or chamfered in a manner which facilitates insertion of the pipe 66 into the forward opening 28.

FIG. 9 schematically illustrates a portion of an injection molding machine 72 for forming the composite fittings 20, in accordance with the exemplary embodiment of the present invention. It is preferred for the molding machine 72 to manufacture multiple of the composite fittings 20 simultaneously; however, for purposes of clarifying this disclosure, only a representative portion of the molding machine 72 is illustrated in FIG. 9. As schematically illustrated in FIG. 9, the machine 72 includes an actuator 74 for moving one or more mold inserts 76 relative to a jig 78. The actuator 74 moves the mold insert 76 between a molding configuration and a loading configuration. As will be discussed in greater detail below, the composite fitting 20 is formed during the molding configuration. In contrast, the loading configuration is for loading and unloading, as will be discussed in greater detail below. FIG. 9 schematically illustrates the molding configuration during molding of the secondary body 22, in which the already-formed main body 24 is hidden from view within the closed jig 78, and a portion of the mold insert 76 is hidden from view within the jig and the main body; and these hidden from view items are schematically illustrated by broken lines in FIG. 9.

FIGS. 10 and 11 are partial, isolated, cross-sectional views of the jig 78, in its closed configuration, respectively taken along lines 10-10 and 11-11 of FIG. 9. FIGS. 10 and 11 illustrate that the openable and closable jig 78 includes opposite halves. The opposite halves of the jig 78 are closed/locked together during the molding configuration of the molding machine 72, and they are unlocked and separated from one another during the loading configuration of the molding machine. When closed and locked together, the opposite halves of the jig 78 together define a receptacle 80 for initially molding a main body 24 of a first polymeric material, and subsequently holding the main body 24 while molding a secondary body 22 of a second polymeric material into the main body to form a composite fitting 20. Such a multi-step molding process is known in the injection molding art and is commonly referred to as a multi-shot injection process. Persons skilled in the art will recognize and understand that differing mold inserts 76 of differing configurations may be required for the separate steps of molding the main body 24 and then molding the secondary body 22 into the main body 24. Alternatively, the receptacle 80 may be utilized to hold a preformed main body 24 while the secondary body 22 is molded into the main body 24.

In accordance with the exemplary embodiment of the present invention; the receptacle 80 of the jig includes adjacent polygonal and cylindrical envelopes that are respectively illustrated in FIGS. 10 and 11. The polygonal envelope of FIG. 11 is most preferably hexagonal and is for forming, and subsequently closely engaging and extending around, the hexagonal portion 36 (FIGS. 1 and 2) of the main body 24. The cylindrical envelope of FIG. 10 is for forming, and subsequently closely engaging and extending around, the outer surface of the cylindrical sidewall 44 (FIGS. 1-3) of the main body 24.

Referring to FIG. 10, the receptacle 80 initially forms the main body 24 with the hole 42 in the sidewall 44 (FIGS. 1 and 4) in a first injection molding step, and then holds the main body 24 in a predetermined position so that the hole 42 (FIGS. 1 and 4) in the sidewall 44 of the main body is aligned with a gate 82 (e.g. passageway for supplying molding material) of the jig 78 during the molding configuration of the secondary body 22 within the main body 24. Referring to FIG. 9, the gate 82 is in fluid communication with conventional equipment 84 for providing molding material under pressure, and the gate is for injecting the molding material into the hole 42. The gate 82 and portions of a supply channel 86 connecting the gate to the equipment 89 that is, the source of molding material are hidden from view in FIG. 9; therefore, broken lines illustrate them.

The molding configuration of the secondary body 22 is partially illustrated in FIG. 12, which is a cross-sectional view taken along line 12-12 of FIG. 10 and is illustrative of the jig 78 in its open configuration, in accordance with the exemplary embodiment of the present invention. In the molding configuration, the main body 24 is held in the predetermined configuration in the jig 78 and the mold insert 76 is in the passageway through the main body 24 so that an annular chamber 88 is defined between the main body and the mold insert. The main body 24 extends around the chamber 88 and the chamber 88 extends around the mold insert 76. At the same time, the mold insert 76 annularly engages surfaces of the main body 24 so that the chamber 88 is substantially closed, except for being in communication with the gate 82. In accordance with the exemplary embodiment of the present invention, the mold insert 76 generally resembles a cylindrical rod that is tapered in somewhat of a stepped fashion so as to include a predetermined arrangement of annular bevels and shoulders. The cross-section of the mold insert 76 that is illustrated in FIG. 12 is preferably representative of all straight cross-sections that can be taken through and perpendicular to the central axis of the mold insert.

During the molding configuration illustrated in FIG. 12, the molding material (e.g., liquid CPVC) is injected into the chamber 88 via the gate 82 and the hole 42, so that the hole 42 functions as an injection point by way of which the molding material is introduced into the chamber 88. This injecting is carried out so that the chamber 88 and hole 42 are preferably completely filled, and then the molding material in the chamber 88 is allowed to solidify, so that it becomes the rigid secondary body 22.

As noted above, the provision of the O-ring 61 in embodiments of the present invention may be optional. If it is desired to include an O-ring in a fitting of the present invention, it is contemplated that the O-ring may be formed by molding as part of the injection molding process via an additional injection step, or "shot," performed after molding or insertion of the main body and before molded injection of the secondary body into the main body. In such cases, the O-ring 61 may be molded of a third polymeric material different form that of the main and secondary bodies, 24,22, e.g., preferably of a compressibly resilient polymeric material such as a thermoplastic vulcanizate or another thermoplastic elastomer. Alternatively, in embodiments of the invention in which a pre-formed O-ring 61 may be utilized, the O-ring 61 (FIGS. 3 and 7) will be inserted into and thereafter contained by the main body 24 during the molding of the secondary body 22. However, the O-ring is omitted from FIG. 12 to clarify the view. As discussed in greater detail below, in embodiments of the fitting utilizing a pre-formed O-ring 61, the molding material may be injected with sufficient pressure and/or under other conditions so that the O-ring 61 is compressed in a radially outward direction during the injection molding, so that the O-ring can, if required, subsequently expand and contract to compensate for any differences in the expansion and contraction of the polymeric and main bodies 22, 24 and thereby enhance leak-proof functioning of the composite fitting 20. The molding machine 84 is transitioned to the loading configuration after the injection molding.

In the loading configuration of the molding machine 24, the mold insert 76 has been withdrawn preferably at least from the receptacle 80 (FIGS. 10 and 11) of the jig 78. Then, the jig 78 can be opened and the composite fitting 20 can be removed from the jig. In accordance with the exemplary embodiment of the present invention, breaking the composite fitting 20 away from the polymeric material that solidified in the gate 82 and channel 86 completes fabrication of the composite fitting. That is, an annular shoulder or face 91 (FIG. 12) of the mold insert 76 preferably includes indicia (not shown) so that the indicia 56 (FIG. 2) of the composite fitting 20 is formed during molding of the secondary body 22. Solidified polymeric material in the gate 82 and supply channel 86 is preferably cleared prior to forming the next composite fitting 20. Then, a new main body 24 can be molded in the receptacle 80 of the jig 78, or a pre-formed main body 24 may be placed in the receptacle 80, and the molding machine 84 can be returned to the molding configuration.

As best understood with reference to FIG. 3, the hole 42 in the sidewall 44 of the main body 24 is preferably positioned farther from the outward or forward end face 54 of the secondary body 22 than from the hidden inward or rearward end face 58 of the polymeric body. This advantageously helps to ensure that the secondary body 22 is fully and properly formed within the main body 24. That is, from a quality control standpoint, a visual confirmation that the readily viewable forward end face 54 of the secondary body 22 is fully formed should advantageously also serve as a confirmation that the hidden, rearward end face 58 and other portions of the polymeric body are fully formed, since the hole 42 is closer to the rearward end face than it is to the forward end face. In accordance with alternative embodiments of the present invention, the hole 42 is arranged differently, and it is possible that the hole 42 could be omitted, such as by including the gate 82 (FIGS. 9 and 12) in the mold insert 76 rather than the jig 78.

FIG. 13 is a cross-sectional view of a composite fitting 20' that is like the composite fitting 20 described with reference to FIGS. 1-12, except that the composite fitting 20' of FIG. 13 includes an internally threaded receptacle 90 for internally connecting the composite fitting 20' to a metallic pipe or fitting. The threading of the internally threaded receptacle 90 terminates proximate an inner and inwardly extending annular shoulder 92. The shoulder 92 can function as a stop for engaging an end of a metallic pipe or fitting installed into the receptacle 90, for arresting relative movement between the composite fitting 20' and the metallic pipe or fitting.

FIG. 14 is a cross-sectional view of a portion of a composite fitting 20" that is, in accordance with a first embodiment of the present invention, like the composite fitting 20 described with reference to FIGS. 1-12, and that is, in accordance with a second embodiment of the present invention, like the composite fitting 20' of FIG. 13, except that for each of these first and second embodiments, the main body 24" further includes an axial groove 94 which is occupied by an axial protrusion 96 of the secondary body 22". Each of the axial groove 94 and the axial protrusion 96 encircles and extends preferably parallel to the central axis of the main body 24". As illustrated in FIG. 14, the axial groove 94 includes a pair of shoulders that are radially spaced apart from one another, and that are each coaxial with the central axis of the composite fitting 20". Accordingly, in accordance with the first and second embodiments of the present invention, the main body 24" includes annular grooves that extend nonparallel to one another, the secondary body 22" includes annular protrusions that extend nonparallel to one another, and the protrusions are respectively positioned in the grooves in a manner which seeks to stabilize the composite fittings to allow the composite fittings to function optimally.

FIGS. 15-17 illustrate a composite fitting 20''' in accordance with another embodiment of the present invention. The composite fitting 20''' is like the composite fitting of the second embodiment of the present invention except that the main body 24''' of the composite fitting 20''' is modified. The main body 24''' is angled, such as to define a 90 degree angle, so that the composite fitting 20''' is in the form of an elbow. That is, the portions of the passageway 26''', which respectively include the openings 28 and 30''', respectively extend around axes, and an angle is defined between these axes, such as angle of 90 degree. Other angles are also within the scope of the present invention. Also, the main body 24''' includes ears or lobes 100 that are generally of the type that are included in conventional drop ear elbows. A hole 102 extends completely through each of the lobes 100. Fasteners, such as nails or screws, can be inserted through the holes 102 for the purpose of mounting the composite fitting 20''' to a reference structure, such as a stud or other structural component of a building, or the like. Also, the main body 24''' optionally includes an annular flange 98 that encircles the opening 30'''. As illustrated in FIGS. 15-17, the main body 24''' does not include the outer polygonal portion 36 (e.g., see FIG. 1), but the main body 24''' can optionally include the outer polygonal portion 36.

FIG. 18 is a cross-sectional view of another embodiment of a composite fitting 20'''' in accordance with the present invention, similar to the composite fitting 20' of FIG. 13 in that the composite fitting 20'''' includes an internally threaded receptacle 90 for internally connecting the composite fitting 20'''' to a metallic pipe or fitting. The threading of the internally threaded receptacle 90 terminates proximate an inner inwardly extending annular shoulder 92 to function as a stop for an end of a metallic pipe or fitting. The composite fitting 20'''' has an annular recess 95 formed in the annular interior surface at the forward end of the main body 24'''' in which is molded and received the tubular secondary body 22''''. The inward interior end of the recess 95 forms an annular interior shoulder 97 adjacent the recess 95 surrounding the passageway 26 generally midway between the opposite forward and rearward ends of the main body 24''''. Thus, the tubular secondary body terminating adjacent the shoulder 97 and an O-ring 61 is formed or disposed in the inward end of the recess 95 between the secondary body 22'''' and the shoulder 97. As previously indicated, the O-ring 61 may be molded into the recess 95 so as to be intimately secured against the shoulder 97. The main body 24'''' includes an annular groove surrounding the forward opening 28 adjacent the recess 95 and the secondary body 22'''' includes an annular protrusion which extends radially outwardly into intimate surface contact within the annular groove.

In accordance with exemplary embodiments of the present invention, features of the composite fittings advantageously operate in a manner which seeks to stabilize the composite fittings to allow the composite fittings to function in a leakproof manner for very many years, even if exposed to many extreme cycles of stress, such as may be caused by variations in the pressure and/or temperature of the water or other medium passing through the composite fittings. As described above, the respective polymeric materials forming the main and secondary bodies of the composite fitting may optimally be selected to have compatible coefficients of expansion and contraction (and other compatible physical characteristics) to minimize or eliminate a risk for the respective bodies to separate from one another due to such stresses, as may occur in composite fittings using metallic and polymeric components. Thus, the need or desirability for an O-ring to be provided in the fitting between the main and secondary bodies to perform a sealing function is lessened or eliminated in fittings of the present invention. If it is desired to include an O-ring in a fitting of the present invention, it is contemplated as discussed above that the O-ring may be formed by molding as part of the injection molding process via an additional injection step, or "shot," performed after molding or insertion of the main body and before molded injection of the secondary body into the main body.

Alternatively, if it is desired to utilize a preformed O-ring 61, rather than forming an O-ring via a molding step, the sealing functionality of the O-rings 61 can be enhanced by compressing (e.g., "flattening") the O-rings in a radially outward direction when molding the polymeric bodies into the main bodies, so that the O-rings can, if required, subsequently expand and contract to compensate for any differences in the expansion and contraction of the main and secondary polymeric bodies.

Such compressing of the O-rings 61 during manufacture can be enhanced, for example, by decreasing their modulus of elasticity, such as by preheating the o-rings. As an additional example, the molding material for the secondary bodies (e.g., see the source of molding material 84 in FIG. 9) can be injected in a manner that enhances the compressing of the O-rings 61, such as by injecting the molding material at higher pressures, increasing the duration of the injecting, or making the pressure gradient of the injected molding material more uniform. As one example, and as best understood with reference to FIGS. 9 and 10, which only show one gate 82 per receptacle 80, it may be possible to achieve a more uniform pressure gradient by injecting the molding material into each receptacle through more than one gate, such as via two gates which are diametrically opposed, or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A pipe fitting for connecting between a metallic pipe and a polymeric pipe, the pipe fitting comprising:
    a tubular main body defining a fluid flow passage therethrough between a first opening at a first end of the main body for connection with an end section of the polymeric pipe and a second opening at a second end of the main body for connection with an end section of the metallic pipe,
    the main body being molded of a first polymeric material,
    a tubular secondary body of a second polymeric material molded into substantially coextensive surface contact with an annular interior surface of the first end of the main body surrounding the fluid flow passage for defining a portion thereof and terminating at a spacing from the second end of the main body,
    the second end of the main body being annularly formed with a spiral thread for mated connection with a corresponding thread about the end section of the metallic pipe,
    the tubular secondary body being configured to mate in surface engagement about the end section of the polymeric pipe,
    wherein the main body includes a hole extending through the main body into communication with the annular interior surface of the first end of the main body, the tubular secondary body including a protrusion extending into and obstructing the hole.

2. A pipe fitting according to claim 1, wherein the first and second polymeric materials are selected to have compatible coefficients of expansion and contraction.

3. A pipe fitting according to claim 1, wherein the first polymeric material of the main body and the metallic material of the metallic pipe have compatible hardness and flexure characteristics.

4. A pipe fitting according to claim 3, wherein the main body comprises reinforcing fibers dispersed within the first polymeric material.

5. A pipe fitting according to claim 4, wherein the reinforcing fibers are selected from the group consisting of carbon, glass, aramid and stainless steel fibers.

6. A pipe fitting according to claim 1, wherein the first polymeric material is selected from the group consisting of polyamide and polyphthalamide.

7. A pipe fitting according to claim 1, wherein the second polymeric material is chlorinated polyvinyl chloride.

8. A pipe fitting according to claim 1, wherein the annular interior surface of the first end of the main body is recessed for receiving the tubular secondary body, the main body having an annular interior shoulder adjacent the annular interior recess surrounding the passage between the first and second ends of the main body, the tubular secondary body terminating adjacent the shoulder.

9. A pipe fitting according to claim 8, wherein an O-ring is disposed between the tubular secondary body and the shoulder.

10. A pipe fitting according to claim 9, wherein the O-ring is molded to the annular shoulder.

11. A pipe fitting according to claim 9, wherein the O-ring is formed of a third polymeric material.

12. A pipe fitting according to claim 11, wherein the third polymeric material is a thermoplastic elastomer.

13. A pipe fitting according to claim 12, wherein the third polymeric material is a thermoplastic vulcanizate.

14. A pipe fitting according to claim 8, wherein the main body includes an annular groove surrounding the first opening adjacent the recessed annular interior surface of the first end of the main body, the tubular secondary body including an annular protrusion extending radially outwardly into substantially coextensive surface contact with the annular groove.

15. A pipe fitting according to claim 1, wherein the spiral thread of the second end of the main body is formed exteriorly thereabout.

16. A pipe fitting according to claim 1, wherein the spiral thread of the second end of the main body is formed interiorly thereabout.

17. A pipe fitting according to claim 1, wherein an end of the tubular secondary body is flush with the first end of the main body at the first opening.

18. A pipe fitting according to claim 1, wherein the main body includes an outer polygonal portion for being engaged by a wrench.

19. A pipe fitting according to claim 1, wherein the first end of the main body and the tubular secondary body therein define a receptacle for internally receiving the end section of the polymeric pipe.

20. A pipe coupling assembly comprising:
a metallic pipe having an end section with a spiral thread extending thereabout;
a polymeric pipe having an end section, and
a pipe fitting comprising:
a tubular main body defining a fluid flow passage therethrough between a first opening at a first end of the main body and a second opening at a second end of the main body,
the main body being molded of a first polymeric material,
a tubular secondary body of a second polymeric material molded into substantially coextensive surface contact with an annular interior surface of the first end of the main body surrounding the fluid flow passage for defining a portion thereof and terminating at a spacing from the second end of the main body,
the second end of the main body being annularly formed with a spiral thread, the end section of the metallic pipe being connected with the second end of the main body of the pipe fitting with the respective spiral threads of the metallic pipe and the main body in mated threaded engagement,
the end section of the polymeric pipe being inserted into and connected with the first end of the main body of the pipe fitting with the tubular secondary body in sealing mated surface engagement about the end section of the polymeric pipe,
wherein the main body includes a hole extending through the main body into communication with the annular interior surface of the first end of the main body, the tubular secondary body including a protrusion extending into and obstructing the hole.

21. A pipe coupling assembly according to claim 20, wherein the first and second polymeric materials are selected to have compatible coefficients of expansion and contraction.

22. A pipe coupling assembly according to claim 20, wherein the first polymeric material of the main body and the metallic material of the metallic pipe have compatible hardness, expansion and flexure characteristics.

23. A pipe coupling assembly according to claim 22, wherein the main body comprises reinforcing fibers dispersed within the first polymeric material.

24. A pipe coupling assembly according to claim 23, wherein the reinforcing fibers are selected from the group consisting of carbon, glass, aramid and stainless steel fibers.

25. A pipe coupling assembly according to claim 20, wherein the first polymeric material is selected from the group consisting of polyamide and polyphthalamide.

26. A pipe coupling assembly according to claim 20, wherein the second polymeric material is chlorinated polyvinyl chloride.

27. A pipe coupling assembly according to claim 20, wherein the annular interior surface of the first end of the main body is recessed for receiving the tubular secondary body, the main body having an annular interior shoulder adjacent the annular interior recess surrounding the passage between the first and second ends of the main body, the tubular secondary body terminating adjacent the shoulder.

28. A pipe coupling assembly according to claim 27, wherein an O-ring is disposed between the tubular secondary body and the shoulder.

29. A pipe coupling assembly according to claim 28, wherein the O-ring is substantially coextensively molded to the annular shoulder.

30. A pipe coupling assembly according to claim 28, wherein the O-ring is formed of a third polymeric material.

31. A pipe coupling assembly according to claim 30, wherein the third polymeric material is a thermoplastic elastomer.

32. A pipe coupling assembly according to claim 31, wherein the third polymeric material is a thermoplastic vulcanizate.

33. A pipe coupling assembly according to claim 27, wherein the main body includes an annular groove surrounding the first opening adjacent the recessed annular interior surface of the first end of the main body, the tubular secondary body including an annular protrusion extending radially outwardly into substantially coextensive surface contact with the annular groove.

34. A pipe coupling assembly according to claim 20, wherein the spiral thread of the second end of the main body is formed exteriorly thereabout and the spiral thread of the end section of the metallic pipe is formed interiorly thereof.

35. A pipe coupling assembly according to claim 20, wherein the spiral thread of the second end of the main body is formed interiorly thereabout and the spiral thread of the end section of the metallic pipe is formed exteriorly thereof.

36. A pipe coupling assembly according to claim 20, wherein an end of the secondary polymeric body is flush with the first end of the main body at the first opening.

37. A pipe coupling assembly according to claim 20, wherein the main body includes an outer polygonal portion for being engaged by a wrench.

38. A pipe coupling assembly according to claim 20, wherein the first end of the main body and the tubular secondary body therein define a receptacle internally receiving the end section of the polymeric pipe.

* * * * *